United States Patent Office 3,412,063
Patented Nov. 19, 1968

3,412,063
LOW TEMPERATURE CURED CERAMIC
COATING COMPOSITION
Enos Dean Jarboe and Prosper Louis Soucy, St. Louis, Mo., assignors to Plas-Chem Corporation, St. Louis, Mo., a corporation of Missouri
No Drawing. Filed Sept. 7, 1965, Ser. No. 485,621
5 Claims. (Cl. 260—37)

ABSTRACT OF THE DISCLOSURE

A liquid coating composition that can be air-cured or heat-cured, using a silicate base typified by tetraethyl orthosilicate and aluminum oxide to provide a hard infusible coating for various types of substrata. Titanium dioxide may be added for improved results, together with trimethyl borate or tetra butyl titanate as reaction accelerators and various suspension agents to provide a one package liquid composition providing a hard infusible and fast curing coating with high dielectric strength and a high degree of inflammability.

---

In the past, it has been a problem to provide an air-cured ceramic coating that combines a high degree of hardness with a good degree of build, i.e., thickness, and with good dielectric strength properties and adhesion. By means of this invention, there has been made available such an air-cured ceramic coating that has features heretofore unavailable to provide the qualities of hardness, build, and dielectric strength. The coating can be built up to substantial thicknesses, as an example, about twenty to thirty mils without the problem of cracking or crazing. Further, the coating is tenacious and cannot be readily scratched off or scraped off, nor does the coating have undesirable crumbling characteristics. The coating composition of this invention features the use of aluminum oxide with hydrolyzed tetraethyl orthosilicate. The use of aluminum oxide has been found to be essential to the practice of the invention to obtain the desired characteristics and physical properties mentioned above. The success of the use with aluminum oxide is surprising, since this is quite a reactive oxide which has a tendency to cause gelling, but has been found to be successful where other oxides have failed.

The coating composition of the hydrolyzed tetraethyl orthosilicate and aluminum oxide is further compatible with the use of a number of inorganic pigments or fillers and extenders to provide a wide range of coating composition for use in various substrates under varying requirements.

It is a feature of this invention that the coating provided has excellent adhesion to various types of substrata, such as glass, concrete, copper, aluminum, steel, zinc, and synthetic polymers, such as epoxies and the urethanes, and also various types of ceramics. The coating provided is very hard and infusible with excellent properties of moisture resistance and noninflammability, and a high dielectric strength.

Essentially, the coating includes as its predominant components hydrolyzed tetraethyl orthosilicate, aluminum oxide and titanium dioxide. These components are believed to form a complex that provides a hard, infusible, and relatively fast curing irreversible composition. The coating is quite compatible with other types of fillers or pigments, and can be used in conventional solvent systems for ease of application on the various types of strata desired to be coated. The coatings can be laid down from a one package system. The coating composition in the solvent form has a good degree of stability and shelf life, and the ease of application greatly enhances its use in the field. The coating may be applied by brush, spray or roller coating applications.

The above features are objects of this invention and further features will appear in the detailed description which follows and will be otherwise apparent to those skilled in the art.

The tetraethyl orthosilicate base is employed as a binder or vehicle, and is hydrolyzed from 10% to 150%. The hydrolysis of a 100% hydrolyzed vehicle is generally in accordance with the following equation:

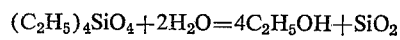

In this equation theoretically 2 moles of water react with 1 mole of tetraethyl orthosilicate to produce a 100% hydrolyzed base. If the reaction is desired to be slowed down, a lower percentage of hydrolysis is employed, and if a higher rate is desired, a higher percentage is employed. The desired and preferred degree of hydrolysis is between the 50% to 100% hydrolysis. The preferred weight percent of binder is 18%–25%. In order to obtain a hydrolyzed vehicle, the respective amounts of water and tetraethyl orthosilicate and solvent are mixed together and upon the addition of a conventional acid, such as hydrochloric acid, the pH is adjusted between 1.5 and 4.5. A resultant exotherm will occur, thus producing a stable binder.

The solvents employed may be conventional solvents, such as alcohols, ketones and glycol ethers.

The basic complex is believed to be formed by an interaction between the hydrolyzed silicate vehicle and aluminum oxide upon the evaporation of the solvent. The aluminum oxide must be of low sodium and iron content to provide maximum hardness of the film, otherwise, with high sodium and iron content, a softer film will result. Preferably, the sodium should be below about 0.02 parts per part of aluminum oxide for maximum hardness. The alumina employed is a tabular sintered alumina having well developed alpha alumina crystals and is characterized by its high chemical purity, mixtures and high electrical resistivity at ultra high frequencies and elevated temperatures. It is employed in finely divided form in the general mesh size of about 200 to 325 mesh. The preferred weight percent of alumina is 25%–68%.

It is believed that the titanium dioxide employed also enters into the complex, although applicants do not wish to be bound by theory on this matter. The preferred weight percent of titanium dioxide is 4%–25%.

The partially, or fully, or over-hydrolyzed vehicle is receptive to various pigment and filler additions. Through proper selection of the inorganic filler, a unique composition is obtained to provide a single package composition with good stability. Also, a two-package system may be employed with the aluminum oxide and the hydrolyzed tetraethyl silicate being employed in separate packages. Zinc dust may also be combined with aluminum oxide in a two-package system to provide an outstanding one coat, corrosion inhibiting, primer-finish for ferrous surfaces. When deposited as a film, and upon the evaporation of the solvent system, a chemical reaction occurs between the vehicle, the aluminum oxide, and the titanium dioxide to produce within between one to two hours a hard, dense, solvent, and water resistant coating with excellent dielectric and heat resistant properties. For some applications, it may be desired to incorporate certain additives such as zinc chloride, trimethyl borate, or tetra butyl titanate to accelerate the reaction rate and hardness of the ceramic coating or additional additives to stabilize or extend the shelf life.

The coating formulation may also incorporate suspension agents such as fibrous fillers as asbestos, bentonites, or amorphous silica to reduce settling tendencies. Where desirable, the white base composition, which is generally afforded by the inclusion of the titanium dioxide, may be tinted with carbon or lampblack, earth pigments, and other conventional pigments to obtain pastel and deep shades of a desired color.

As mentioned previously, the electrical properties are outstanding and the application may be dipped, roller coated, or spray applied, to electrical components to obtain excellent moisture resistance, non-flammability even under overload, and a dielectric strength exceeding 200 volts per mil thickness.

The coating further has excellent adhesion to various types of coatable substrates, such as glass, concrete, copper, aluminum, steel, zinc, and synthetic polymers, such as epoxies and urethanes. It may also be used to provide an exceptional finish for inorganic zinc coatings. The coating can be applied at ambient temperatures down to about 20° F. and under widely varying conditions of humidity. In the top coating for inorganic zinc coatings, it provides an outstanding system to resist fresh and salt water exposures. The coating is completely solvent resistant and may be used as a tank lining system, as well as for potable water tanks. The coating also has excellent abrasion resistance and is unaffected by most weak alkalis or acids. Additionally, the coating has tolerance to humidity, since it is completely unaffected and actually the cure is accelerated under humid conditions, whereas organic coatings have a high tendency to be affected adversely. Thus, organic coatings have tendencies not to adhere properly under such conditions and blister, and to have a high degree of porosity. The coating of this invention may also be applied over damp surfaces.

In application, the coating formulation cures to a hard coating in one to two hours at 75° F. The coating chemically converts into a completely infusible inert finish. For production purposes, the cure may be carried out at elevated temperatures when desired. The degree of temperature application can be used to either accelerate or decelerate the curing period.

There are listed below in Examples I through IX various formulations that may be used in this invention. These formulations show variations and ranges in the preparation of the coatings of this invention, and it will be understood that they are for the purpose of example only and that the invention is not limited thereto. It will be further understood that conventional solvents are used as desired to provide the proper degree of fluidity.

EXAMPLE I

|  | Parts by Weight | Weight Percent |
| --- | --- | --- |
| Hydrolyzed Tetraethyl Orthosilicate | 40 | 20 |
| Alumina | 160 | 80 |
|  | 200 | 100 |

EXAMPLE II

|  | Parts by Weight | Weight Percent |
| --- | --- | --- |
| Hydrolyzed Tetraethyl Orthosilicate | 40 | 22.2 |
| Titanium Dioxide | 40 | 22.2 |
| Alumina | 100 | 55.6 |
|  | 180 | 100.0 |

EXAMPLE III

|  | Parts by Weight | Weight Percent |
| --- | --- | --- |
| Hydrolyzed Tetraethyl Orthosilicate | 40 | 18.2 |
| Titanium Dioxide | 10 | 4.5 |
| Alumina | 150 | 68.2 |
| Mica | 20 | 9.1 |
|  | 220 | 100.0 |

EXAMPLE IV

|  | Parts by Weight | Weight Percent |
| --- | --- | --- |
| Hydrolyzed Tetraethyl Orthosilicate | 40 | 20 |
| Titanium Dioxide | 20 | 10 |
| Aluminum Silicate | 20 | 10 |
| Alumina | 120 | 60 |
|  | 200 | 100 |

EXAMPLE V

|  | Parts by Weight | Weight Percent |
| --- | --- | --- |
| Hydrolyzed Tetraethyl Orthosilicate | 40 | 25 |
| Titanium Dioxide | 40 | 25 |
| Alumina | 10 | 6.3 |
| Magnesium Silicate | 70 | 43.7 |
|  | 160 | 100.0 |

EXAMPLE VI

|  | Parts by Weight | Weight Percent |
| --- | --- | --- |
| Hydrolyzed Tetraethyl Orthosilicate | 40 | 20.9 |
| Titanium Dioxide | 20 | 10.5 |
| Alumina | 120 | 62.9 |
| Mica | 10 | 5.2 |
| Trimethyl Borate | 1.0 | 0.5 |
|  | 191.0 | 100.0 |

EXAMPLE VII

|  | Parts by Weight | Weight Percent |
| --- | --- | --- |
| Hydrolyzed Tetraethyl Orthosilicate | 40 | 19.8 |
| Titanium Dioxide | 40 | 19.8 |
| Alumina | 120 | 59.4 |
| Tetrabutyl Titanate | 2 | 1.0 |
|  | 202 | 100.0 |

EXAMPLE VIII

|  | Parts by Weight | Weight Percent |
| --- | --- | --- |
| Hydrolyzed Tetraethyl Orthosilicate | 40 | 20 |
| Alumina | 120 | 60 |
| Alumina Silicate | 40 | 20 |
|  | 200 | 100 |

EXAMPLE IX

|  | Parts by Weight | Weight Percent |
| --- | --- | --- |
| Hydrolyzed Tetraethyl Orthosilicate | 40 | 20 |
| Iron Oxide Red Pigment | 10 | 5 |
| Aluminum Silicate | 30 | 15 |
| Alumina | 120 | 60 |
|  | 200 | 100 |

Certain changes may be made within the formulations of this invention, as is true for most chemical compositions. Thus, where high temperature resistance to flammability is not a necessary criterion, the various organopolysiloxanes and silicone resins may be employed in addition to the basic compositions set forth previously and may be obtained from conventional sources of supply. Exemplary of these compounds are Dow Corning 805, Dow Corning 840, Dow Corning XR–2121, and Dow Corning R–4471. Coatings using the organopolysiloxanes have a quite high temperature resistance, considerably greater than conventional organic coatings, but do not attain the high temperature or flammability resistance of the tetraethyl orthosilicates, and also require heat curing. They are, however, quite useful in this invention and are an example of partial substitution of components.

EXAMPLE X

|  | Parts by weight | Weight percent |
| --- | --- | --- |
| Hydrolyzed Tetraethyl Orthosilicate | 40 | 22.8 |
| Titanium Dioxide | 20 | 11.5 |
| Alumina | 80 | 45.7 |
| Aluminum Silicate | 20 | 11.5 |
| Organopolysiloxane (Dow Corning R–4471)[1] | 15 | 8.5 |
|  | 175 | 100.0 |

[1] A phenylmethyl polysiloxane resin in xylene solution at a concentration of 55% by weight.

To further enhance adhesion to various substrates and reduce moisture penetration, the organopolysiloxanes may be employed alone as a primer for the low temperature curing ceramic composition.

Other changes and modifications may be made in this invention as will be readily apparent to those skilled in the art. Thus, variation in ranges and substitution of chemical equivalents may be effected within the scope and teaching of this invention as defined by the claims appended hereto.

What is claimed is:
1. A composition of matter consisting essentially of about 18% to 25% tetraethyl orthosilicate liquid binder which is 50 to 100% hydrolyzed, about 25% to 68% alumina and 4% to 25% titanium dioxide, and a member of the group consisting of trimethyl borate and tetra butyl titanate as reaction accelerators.

2. The composition of claim 1 in which there is added a member of the group consisting of fibrous fillers, bentonites, and amorphous silica as suspension agents.

3. A coating composition adherent upon a substrate comprising 18 to 25% tetraethyl orthosilicate which is 50 to 100% hydrolized, about 25% to 68% alumina and 4% to 25% titanium dioxide.

4. The composition of claim 3 in which there is added a silicone resin.

5. The composition of claim 4 in which said silicone resin is an organopolysiloxane.

References Cited

UNITED STATES PATENTS

| | | | |
|---|---|---|---|
| 2,380,945 | 8/1945 | Collins | 106—38.3 |
| 2,743,192 | 4/1956 | White | 106—287 |
| 3,070,861 | 1/1963 | Emblem et al. | 106—38.2 |
| 3,165,799 | 1/1965 | Watts | 106—38.35 |
| 3,262,830 | 7/1966 | Vincent | 117—126 |
| 3,270,382 | 9/1966 | Emblem et al. | 106—38.3 |

JULIUS FROME, *Primary Examiner.*

T. MORRIS, *Assistant Examiner.*